(12) United States Patent
Kolb et al.

(10) Patent No.: US 6,495,287 B1
(45) Date of Patent: Dec. 17, 2002

(54) ELECTROCHEMICAL CELL HAVING A PRE-PASSIVATED ELECTRODE AND ASSOCIATED FABRICATION PROCESS

(75) Inventors: Eric S. Kolb; Denis G. Fauteux, both of Acton, MA (US)

(73) Assignee: Mitsubishi Cehmical Corporation (JP)

( * ) Notice: Subject to any disclaimer, the term of this patent is extended or adjusted under 35 U.S.C. 154(b) by 0 days.

(21) Appl. No.: 09/315,721

(22) Filed: May 20, 1999

(51) Int. Cl.$^7$ .................................................. H01M 4/60
(52) U.S. Cl. ..................................... 429/215; 429/231.9
(58) Field of Search .............................. 429/215, 218.1, 429/212, 213, 231.8, 231.9; 252/519.3

(56) References Cited

U.S. PATENT DOCUMENTS

| | | | |
|---|---|---|---|
| 5,176,969 A | * | 1/1993 | Miyabayashi et al. |
| 5,314,765 A | | 5/1994 | Bates |
| 5,342,710 A | | 8/1994 | Koksbang |
| 5,366,829 A | | 11/1994 | Saidi |
| 5,387,479 A | | 2/1995 | Koksbang |
| 5,401,598 A | * | 3/1995 | Miyabayashi et al. |
| 5,529,859 A | | 6/1996 | Shu et al. |
| 5,604,056 A | | 2/1997 | Fauteux et al. |
| 5,626,981 A | | 5/1997 | Simon et al. |
| 5,853,917 A | * | 12/1998 | Fauteux et al. |
| 5,968,683 A | * | 10/1999 | Kolb |
| 6,030,719 A | * | 2/2000 | Fauteux et al. |
| 6,045,937 A | * | 4/2000 | Kolb et al. |
| 6,080,282 A | * | 6/2000 | Kolb et al. |

* cited by examiner

Primary Examiner—M. Alexandra Elve
Assistant Examiner—Jonathan Johnson
(74) Attorney, Agent, or Firm—Factor & Partners

(57) ABSTRACT

A pre-passivated electrode for use in an electrochemical cell comprising an uncharged current collecting substrate, an active material layer associated with the substrate, and a solid electrolyte interface layer associated with the active material layer. The pre-passivated electrode fabricated in accordance with the present invention exhibits, among other things, increased coulombic efficiency and capacity.

9 Claims, 5 Drawing Sheets

ELECTROCHEMICAL CELL HAVING A PRE-PASSIVATED ELECTRODE AND ASSOCIATED FABRICATION PROCESS

BACKGROUND OF THE INVENTION

1. Field of the Invention

The present invention relates in general to electrochemical cells, and more particularly, to an electrochemical cell having a pre-passivated electrode. The present invention further relates to a process for fabricating the same.

2. Background Art

Lithium based electrochemical cells, such as lithium ion secondary batteries, have been known in the art for several years. Furthermore, passivated electrodes or electrodes having a solid electrolyte interface (SEI) for use in lithium based batteries have been recently explored. In accordance with conventional technology, passivation of the electrode occurs during the initial charge/discharge cycle by sacrificing a portion of the cell's capacity to form the SEI, which, in turn, results in a battery having lowered capacity and coulombic efficiency.

It is therefore an object of the present invention to provide a lithium ion electrochemical cell that utilizes pre-passivated electrodes to remedy, among other things, the aforementioned detriments and/or complications.

It is also an object of the present invention to provide a process for fabricating a pre-passivated electrochemical cell that remedies the aforementioned detriments and/or complications.

These and other objects of the present invention will become apparent in light of the present Specification, Claims and Drawings.

SUMMARY OF THE INVENTION

The present invention is directed to a pre-passivated electrode for use in an electrochemical cell comprising: a) an uncharged current collecting substrate; b) an active material layer associated with the substrate; and c) a solid electrolyte interface layer associated with the active material layer.

In a preferred embodiment of the invention, the electrode further includes means for increasing the coulombic efficiency of an associated electrochemical cell relative to an electrochemical cell without the solid electrolyte interface layer. In this embodiment the coulombic efficiency increasing means comprises the solid electrolyte interface layer.

In another preferred embodiment of the invention, the electrode further includes means for increasing the capacity of an associated electrochemical cell relative to an electrochemical cell without the solid electrolyte interface layer. In this embodiment the capacity increasing means comprises the solid electrolyte interface layer.

Preferably the current collecting substrate comprises a metallic mesh and the active material layer preferably includes at least one carbonaceous particle.

The present invention is further directed to an electrochemical cell having a pre-passivated electrode comprising a first electrode and a second electrode wherein at least one of the first and second electrodes includes: a) an uncharged current collecting substrate; b) an active material layer associated with the substrate; and c) a solid electrolyte interface layer associated with the active material layer and an electrolyte associated with the first and second electrodes.

In a preferred embodiment of the invention, the electrochemical cell further includes means for increasing the coulombic efficiency of the electrochemical cell relative to an electrochemical cell without the solid electrolyte interface layer. In this embodiment the coulombic efficiency increasing means comprises the solid electrolyte interface layer.

In yet another preferred embodiment of the invention, the electrochemical cell further includes means for increasing the capacity of the electrochemical cell relative to an electrochemical cell without the solid electrolyte interface layer. In this embodiment the capacity increasing means comprises the solid electrolyte interface layer.

Preferably the current collecting substrate of at least one of the first and second electrodes comprises a metallic mesh and the active material layer preferably includes at least one carbonaceous particle.

The present invention is also directed to a process for manufacturing a pre-passivated electrode for use in an electrochemical cell comprising the steps of: a) dissolving a metal with at least one solvent; b) associating an active material with the at least one solvent having the dissolved metal; c) associating an additive with the active material, and, in turn, forming a solid electrolyte interface onto the active material; and d) associating the active material with a current collecting substrate.

In a preferred embodiment of the process, the step of dissolving the metal includes the step of dissolving lithium metal.

In another preferred embodiment of the process, the step of associating the active material with the at least one solvent includes the step of associating an active material having at least one carbonaceous particle.

In yet another preferred embodiment of the process, the step of associating the active material with the current collecting substrate includes the step of associating the active material with a metallic mesh.

Preferably the process further comprises the step of applying a primer to the current collecting substrate.

In another preferred embodiment of the invention, the process further comprises the steps of associating a second electrode and an electrolyte with the pre-passivated electrode.

The present invention is further directed to a process for manufacturing a pre-passivated electrode for use in an electrochemical cell comprising the steps of: a) dissolving a metal with at least one solvent; b) associating an active material with an additive; c) associating the active material associated with the additive with the metal dissolved in the at least one solvent, and, in turn, forming a solid electrolyte interface onto the active material; and d) associating the active material with a current collecting substrate.

BRIEF DESCRIPTION OF THE DRAWINGS

The invention will now be described with reference to the drawings wherein.

DETAILED DESCRIPTION OF THE DRAWINGS

Figure 1:
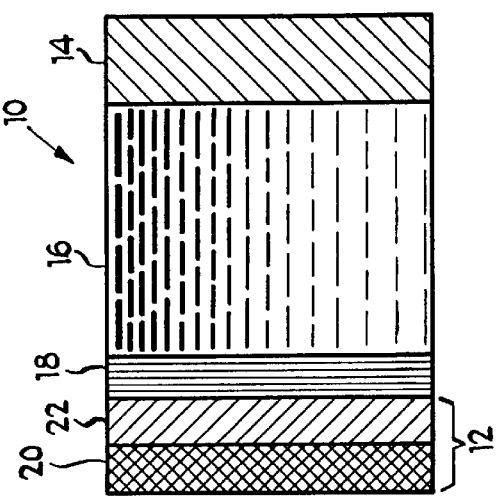
FIG. 1 of the drawings is a schematic representation of an electrochemical cell fabricated in accordance with the present invention.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Electrochemical cell 10 is shown in FIG. 1, prior to application of an initial electrical charge, as generally comprising first electrode 12, second electrode 14, electrolyte 16 and passivation layer or solid electrolyte interface layer (SEI) 18.

First electrode 12 comprises current collecting substrate 20 and active material layer 22. Preferably current collecting substrate 20 is a metallic mesh, fabricated from, for example, copper. Active material layer 22 includes conventional components and preferably includes at least one carbonaceous particle such as carbon black or graphite. Although not shown current collecting substrate 20 can be coated with a conventional primer to increase adhesion between the substrate and active material layer.

For purposes of the present disclosure, electrolyte 16 includes a conventional salt, such as $LiAsF_6$, dissolved in a conventional solvent, such as propylene carbonate (PC) or ethylene carbonate (EC), although other commercially available and conventionally used solvents and salts or electrolyte systems, such as liquid, polymer, and gel systems, as would be readily understood to those having ordinary skill in the art with the present disclosure before them are likewise contemplated for use.

Solid electrolyte interface 18 is associated with at least a portion of active material layer 22. As will be discussed in greater detail below, solid electrolyte interface 18 can be fabricated from anyone of a number of materials and is preferably the product of at least partial degradation of, for example, 1,6-dioxaspiro[4.4]nonane-2-7-dione (1,6 Spiro), 1,4-dioxasipiro[4.5]decane-2-one (1,4 Spiro), or bicyclic bis y-lactone (BBL), or a lithium carboxylic acid salt. While solid electrolyte interface 18 has been disclosed as comprising spiro and cyclic ketones, it will be understood that disclosure to such compounds are merely illustrative of acceptable materials, and are by no means intended to be the only suitable materials. Indeed, it will be understood that other materials that are inert with respect to the remainder of the cell and form a stable passivation or SEI layer on active material 22 are likewise contemplated for use. Preferably such a passivation layer will not form a gas upon its own decomposition during cell cycling and storage. As will be discussed in greater detail below, solid electrolyte interface 18 serves to, among other things, increase the capacity and coulombic efficiency of electrochemical cell 10 relative to a cell without such an interface or passivation layer. While solid electrolyte interface 18 has been disclosed, for illustrative purposes only, as being associated with electrode 12, it is likewise contemplated that the interface can be associated with electrode 14 or both electrodes 12 and 14, respectively.

The present invention is also directed to a process for fabricating electrochemical cell 10 having a pre-passivated electrode. In a first embodiment of the invention the process comprises the following steps.

First, electrodes 12 and 14 are fabricated. For purposes of the present disclosure, electrode 12 will comprise an anode and electrode 14 will comprise a cathode. Of course, in a secondary cell configuration, the anode and cathode will become interchangeable with each other, depending on whether the cell is in a state of charging or discharging. It will be understood that electrodes 12 and 14 are fabricated using conventional techniques.

Second, lithium metal is dissolved in methyltetrahydrofuran (MeTHF) preferably with the assistance of a secondary agent such as naphthalene. While lithium metal has been disclosed as being dissolved in a particular solvent, other metals including, for example, Na, K, Rb, Cs, Fr, Be, Mg, Ca, Sr, Ba, Ra, as well as transition metals are likewise suitable for use—so long as they are soluble in a solvent either alone or with the assistance of a secondary agent. It will be understood that anyone of a number of solvents can be used depending upon the particular metal that is being dissolved. Such solvents will be known to those having ordinary skill in the art having the present disclosure before them.

Third, active material 22 is associated with the solvent having the dissolved lithium. As previously discussed, active material 22 preferably includes a carbonaceous species such as carbon black or graphite.

Fourth, an additive, such as 1,4 Spiro, 1,6 Spiro, or BBL, is associated with the active material and dissolved metal, to, in turn, form a solid electrolyte interface layer 18 on active material 22. The additive reacts with the dissolved metal and active material and partially degrades. The at least partially degraded additive forms the solid electrolyte interface. As previously discussed, anyone of a number of SEI forming additives are suitable for use—so long as the particular additive is compatible with the remainder of the cell.

Fifth, the active material having the solid electrolyte interface is associated with current collecting substrate 20. It will be understood that active material layer having the SEI will be applied using conventional techniques. Once active material 22 is applied to substrate 20, first electrode 12 is fabricated. To complete fabrication of electrochemical cell 10 a second electrode and electrolyte are associated with the electrode 12. As previously discussed, an electrochemical cell fabricated in accordance with the present invention includes a solid electrolyte interface layer prior to an initial electrical charge. As such, only a nominal amount of the cell's capacity will be consumed during the initial charge discharge cycle because the passivation layer is already formed.

In an alternative process the active material can be associated with the additive and then the additive and active material can be associated with a previously prepared metal dissolved in a solvent.

In yet another alternative process the active material can be associated with, for example, metal salts of aromatic carboxylic acids and optionally treated with an additive.

In support of the present invention, the following experiments were conducted wherein the following material preparation was used for each experiment.

GENERAL MATERIAL PREPARATION

First, a container suitable for ball milling was charged with graphite and the desired ratio of aromatic salt. Second, stainless steel beads were added to the container. The container was then sealed and placed on the ball mill for approximately twelve hours. Next, the stainless steel beads were removed from the container and the graphite was charged into a quartz tube, which was equipped with a gas inlet and outlet. Next, the tube was purged with argon at rate of 1.0 L/min for approximately 1 hour. While maintaining the same argon flow, the tube was placed in a furnace and heated to 600 degrees centigrade for approximately 7.5 hours. The sample was then cooled to room temperature for approximately 12 hours with an argon purge rate of around 0.2 L/min. The sample was removed from the quartz tube in a dry room and stored for later use.

ELECTRODE PREPARATION

Electrodes were prepared by mixing the above-prepared active material with a conventional polymeric binder dissolved in organic solvent. The mixture was coated onto a conventional current collector using a BYK—Gardner Multi Clearance Applicator, cured for approximately 2 hours at 150 degrees centigrade, and then compressed approximately 10% using conventional techniques. In this case the polymeric binder comprised about 90% toluene, 9% Kraton D1116G (Shell Oil Co.) and 1% butadiene sulfone (Aldrich Chemical Co.). Round electrodes were formed using a conventional circular die cutter.

COIN CELL FABRICATION AND MATERIAL TESTING

After fabrication the electrodes were then tested in a Hohsen 2032, coin cell test apparatus. Lithium metal was used as the counter electrode and a 1 molar solution of $LiAsF_6$ dissolved in propylene carbonate (PC) served as the nonaqueous electrolyte. In some of the experiments below an additive was formulated into the electrolyte for comparative purposes.

EXPERIMENT No. 1

Approximately 1.0 grams of SFG-6 graphite and approximately 0.3 grams of perylene tetracarboxylic acid tetra potassium salt (PTCATK) were charged into a 20 ml glass scintillation vial. Next, several 0.19 inch diameter stainless steel balls were charged into the vial and the mixture was dry ball milled for approximately 12 hours. The active material was then separated from the mixing media and the scintillation vial was charged into a 1 inch diameter by 18 inches long quartz tube. The comparative or control cell was prepared in accordance with the process of experiment No. 1 except that the addition of PTCATK was omitted from the process.

Figure 2:
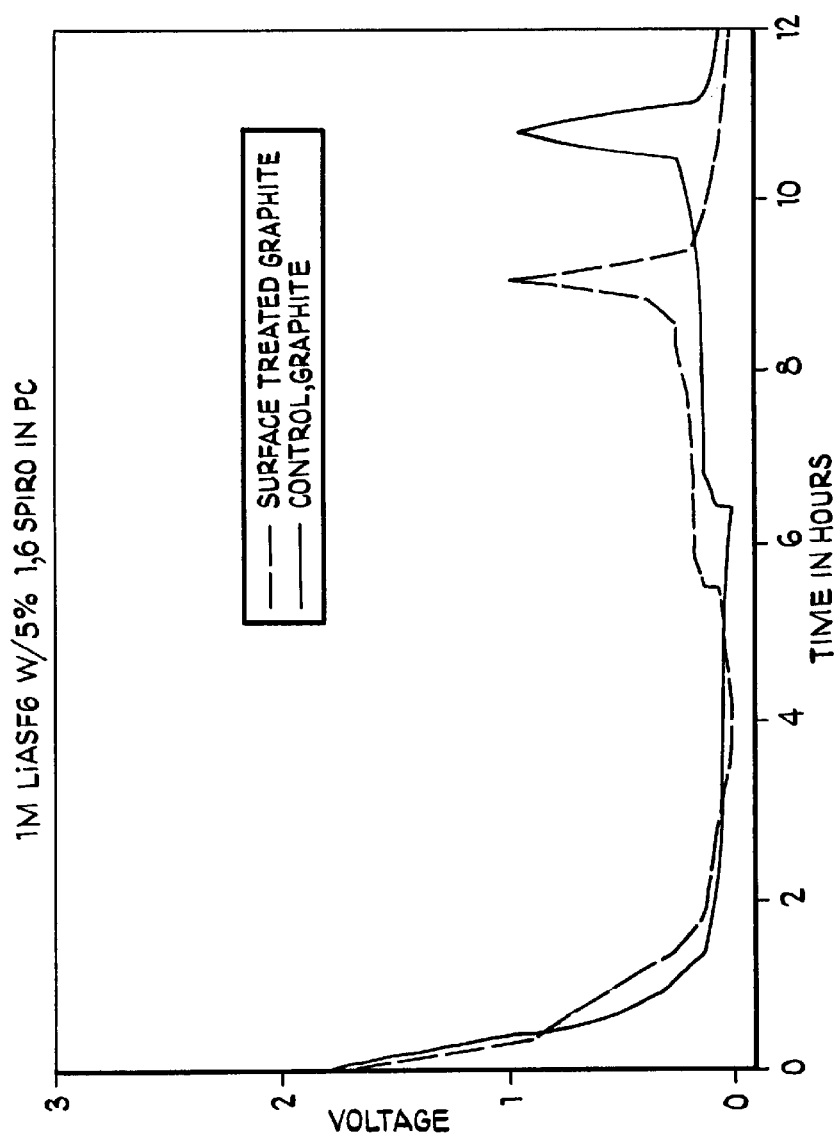
FIG. 2 of the drawings is a plot of voltage versus time for a coin cell fabricated in accordance with experiment number 1 relative to a control.

Results comparing the materials of these Experiments are shown in FIG. 2. Note than an additive 1,6 spiro was added to the electrolyte to prevent electrolyte decomposition. The results clearly demonstrate the benefit of incorporating the lithium carboxylic acid salt, namely, increased capacity, reduced first cycle decomposition, and improved conductivity are all evident from these results.

EXPERIMENT No. 2

Figure 3:
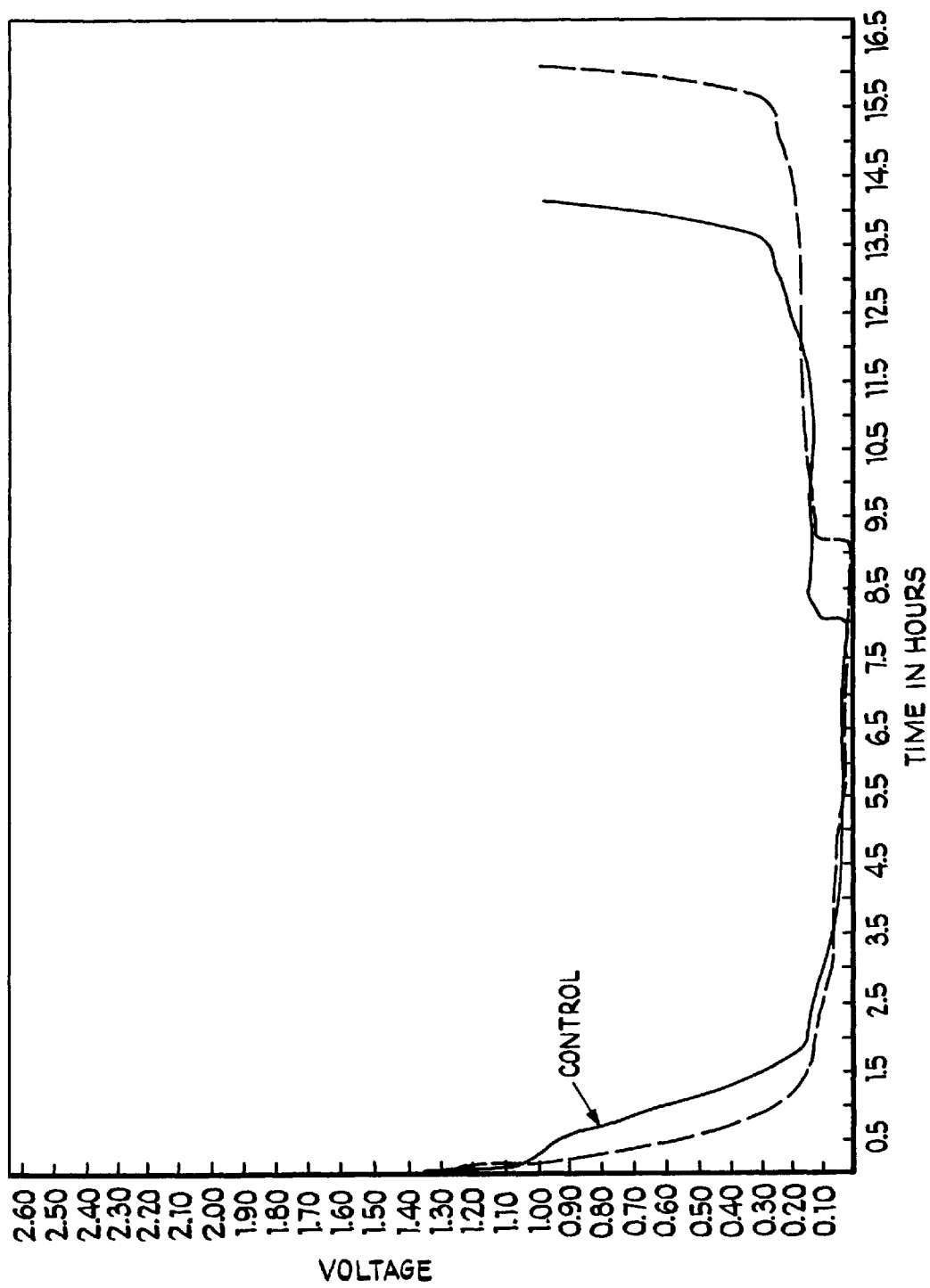
FIG. 3 of the drawings is a plot of voltage versus time for a coin cell fabricated in accordance with experiment number 2 relative to a control.

The process of experiment No. 1 was followed except that approximately 0.1 grams of lithiumpicinolate was used instead of 0.3 grams of PTCATK. Test results are provided in FIG. 3, which show, among other things, the improved electrochemical performance relative to a control—without the lithium carboxylic acid salt.

EXPERIMENT No. 3

Figure 4:
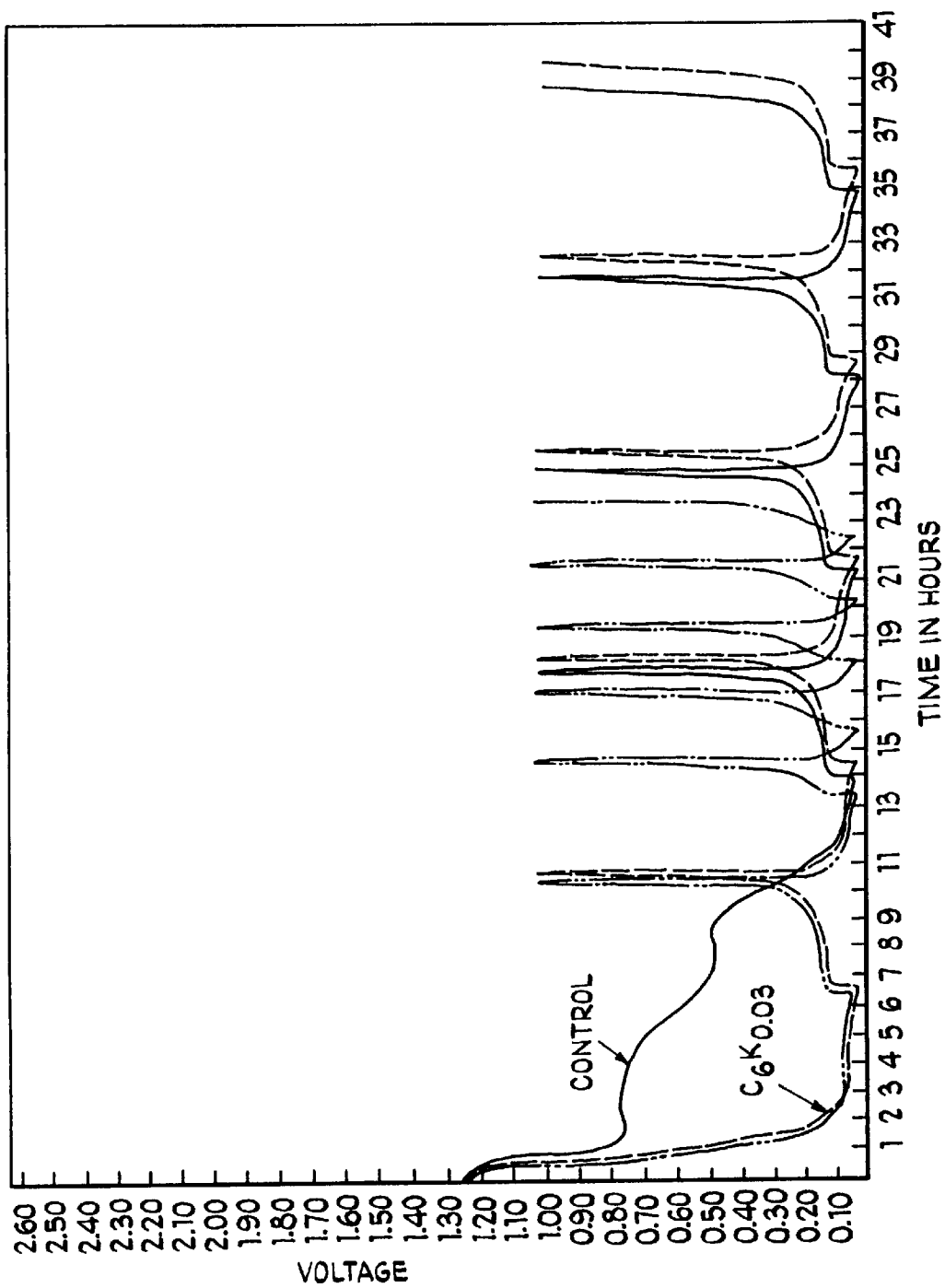
FIG. 4 of the drawings is a plot of voltage versus time for a coin cell fabricated in accordance with experiment number 3 relative to a control.

The process of experiment No. 1 was followed except that no spiro additive was added to the electrolyte. Test results are provided in FIG. 4, which show, among other things, the improved electrochemical performance relative to a control—without the lithium carboxylic acid salt.

EXPERIMENT No. 4

Figure 5:
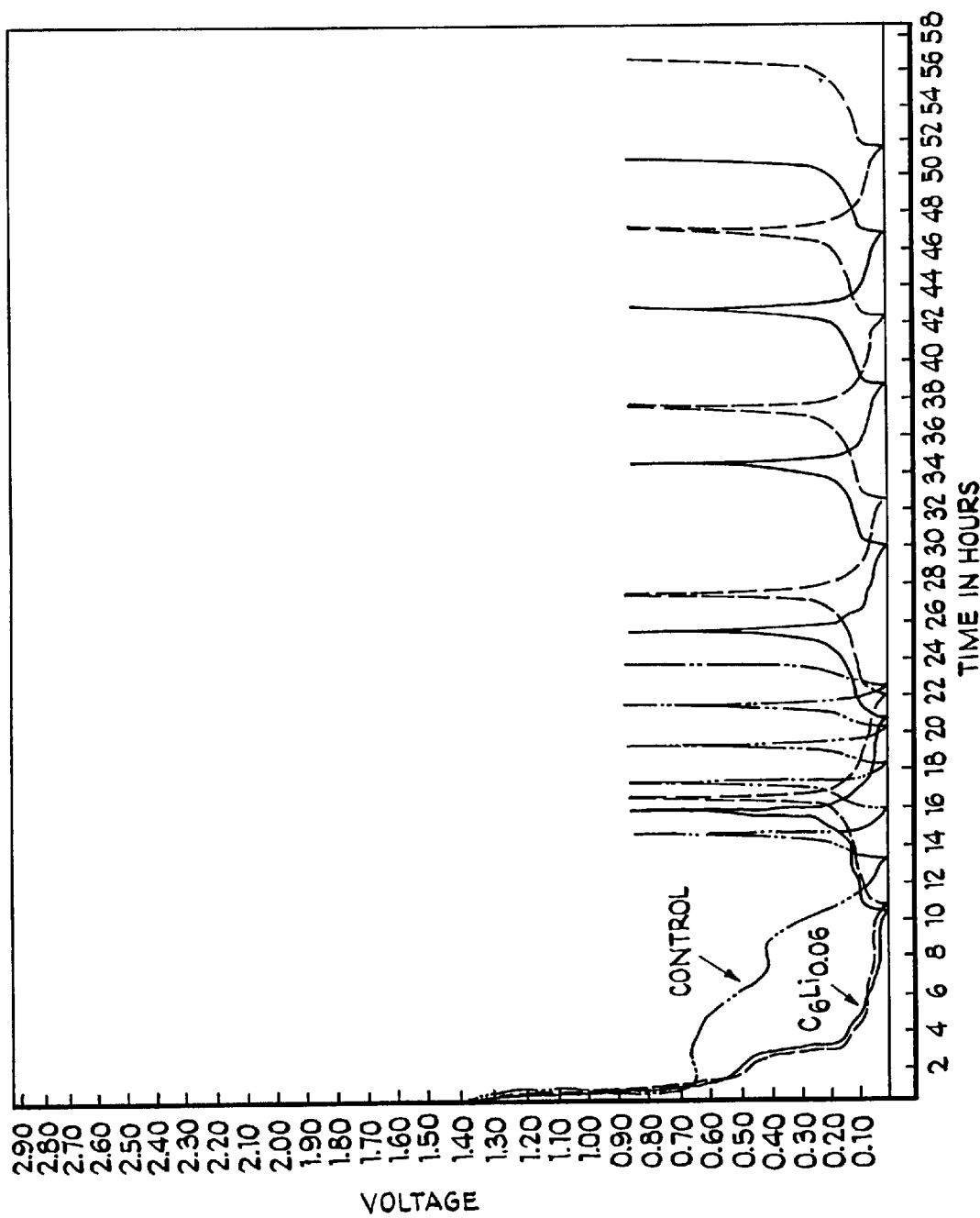
FIG. 5 of the drawings is a plot of voltage versus time for a coin cell fabricated in accordance with experiment number 4 relative to a control.

The process of experiment No. 2 was followed except that no spiro additive was added to the electrolyte. Test results are provided in FIG. 5, which show, among other things, the improved electrochemical performance relative to a control—without the lithium carboxylic acid salt.

EXPERIMENT No. 5

Figure 6:
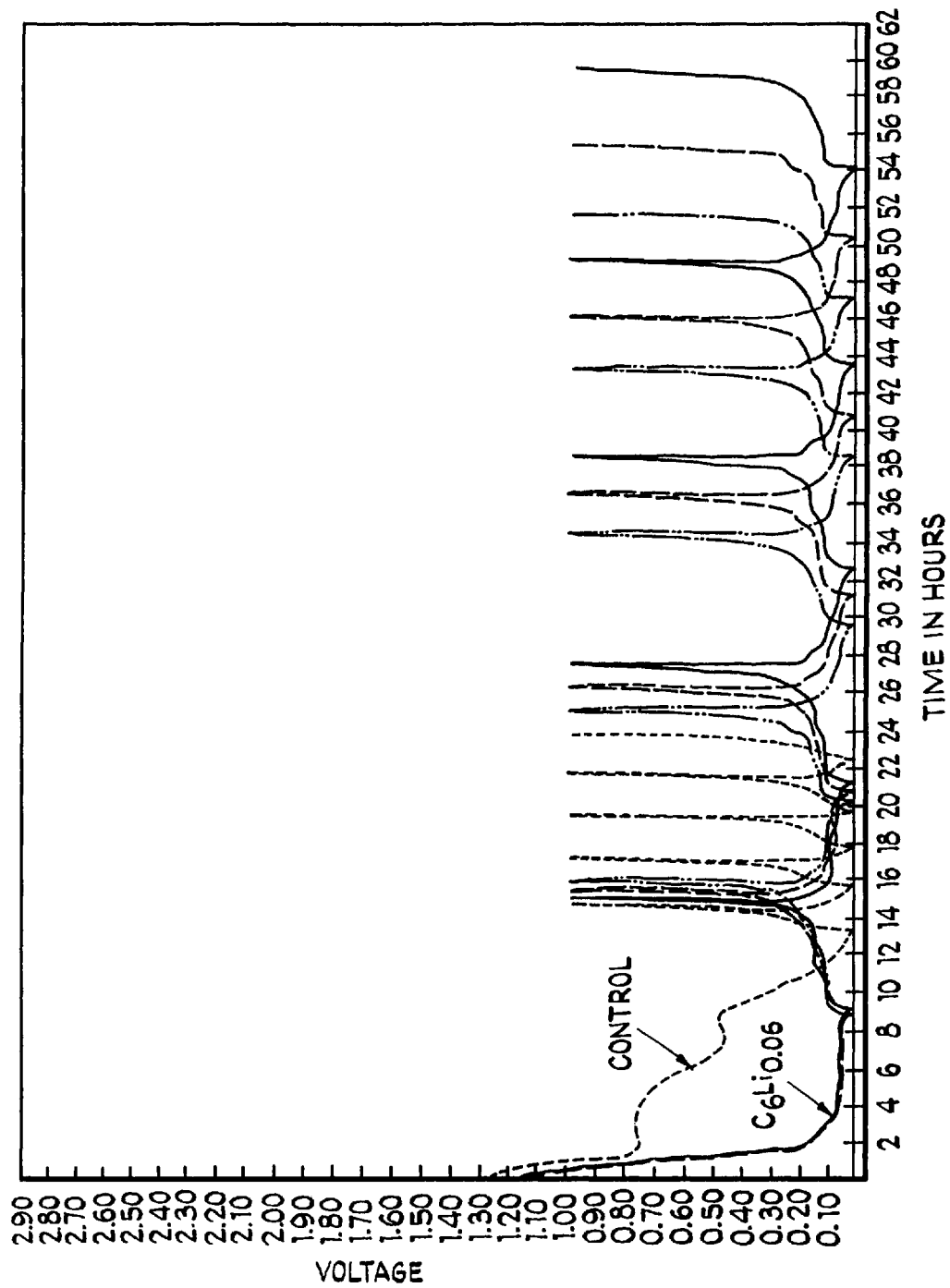
FIG. 6 of the drawings is a plot of voltage versus time for a coin cell fabricated in accordance with experiment number 5 relative to a control.

The process of experiment No. 1 was followed except that 0.11 grams of lithium benzoate was used instead of 0.3 grams of PTCATK. Test results are provided in FIG. 6, which show, among other things, the improved electrochemical performance relative to a control—without the lithium carboxylic acid salt.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. A process for manufacturing a pre-passivated electrode for use in an electrochemical cell, comprising the steps of:

dissolving a metal with at least one solvent, wherein the metal is elemental;

associating an active material with the at least one solvent having the dissolved metal;

associating an additive with the active material, and, in turn, forming a solid electrolyte interface onto the active material; and associating the active material with a current collecting substrate.

2. The process according to claim 1, wherein the step of dissolving the metal includes the step of dissolving lithium metal.

3. The process according to claim 1, wherein the step of associating the active material with the at least one solvent includes the step of associating an active material having at least one carbonaceous particle.

4. The process according to claim 1, wherein the step of associating the active material with the current collecting substrate includes the step of associating the active material to a metallic mesh.

5. The process according to claim 1, further comprising the step of applying a primer to the current collecting substrate.

6. The process according to claim 1 further comprising the steps of associating a second electrode and an electrolyte with the pre-passivated electrode.

7. A process for manufacturing a pre-passivated electrode for use in an electrochemical cell, comprising the steps of:

dissolving a metal with at least one solvent, wherein the metal is elemental;

associating an active material with an additive;

associating the active material associated with the additive with the metal dissolved in the at least one solvent, and, in turn, forming a solid electrolyte interface onto the active material; and associating the active material with a current collecting substrate.

8. The process according to claim 7, wherein the step of associating an active material includes the steps of:

mixing a carboxylic acid salt with carbonaceous particles; and heating the mixture of the carboxylic acid and carbonaceous particles; and the step of forming a solid electrolyte interface onto the active material includes the step of forming a solid electrolyte interface onto the carbonaceous particles and, in turn, preparing an active material.

9. The process according to claim 8, wherein the step of forming a solid electrolyte interface includes the step of introducing an additive to the mixture of carboxylic acid salt and carbonaceous particles.

* * * * *